No. 607,078. Patented July 12, 1898.
P. F. RIBBE.
ELECTRODE PLATE FOR ELECTRIC ACCUMULATORS.
(Application filed Jan. 25, 1898.)
(No Model.)
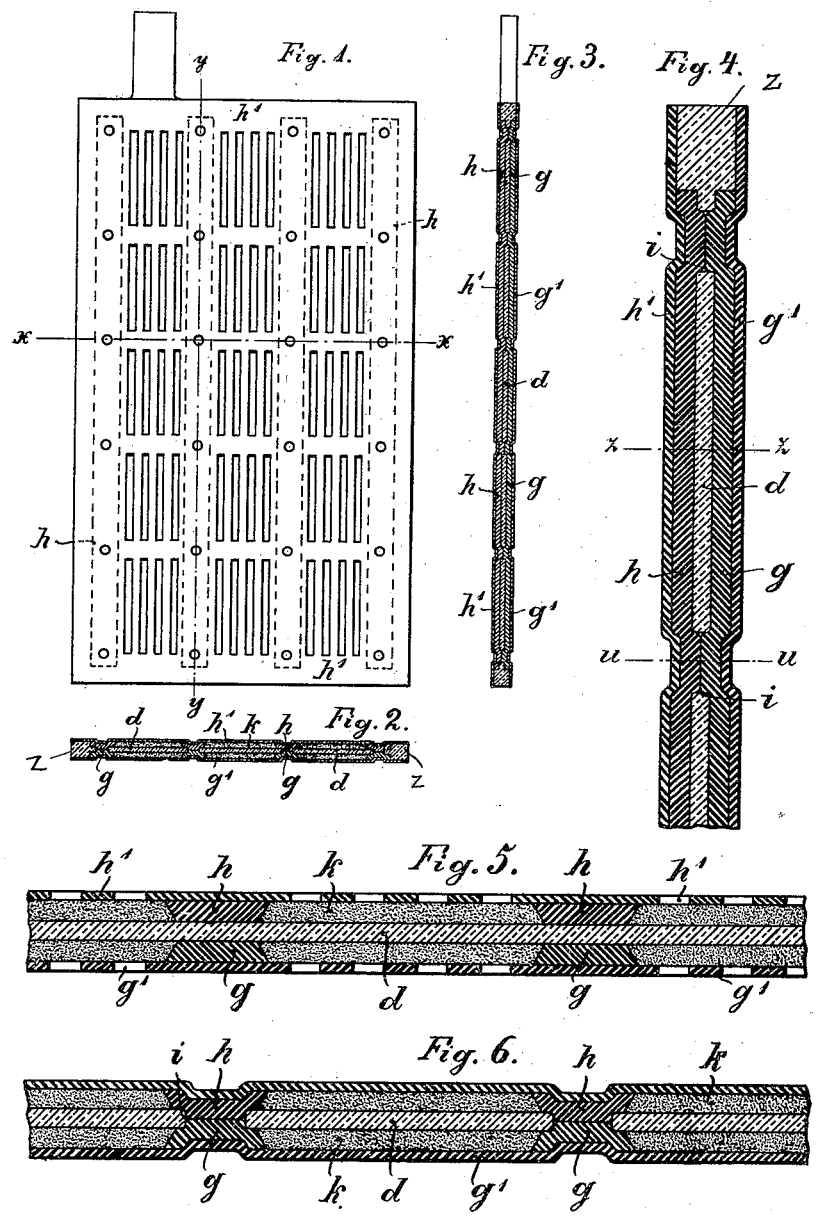

United States Patent Office.

PAUL FERDINAND RIBBE, OF BERLIN, GERMANY.

ELECTRODE-PLATE FOR ELECTRIC ACCUMULATORS.

SPECIFICATION forming part of Letters Patent No. 607,078, dated July 12, 1898.

Application filed January 25, 1898. Serial No. 667,906. (No model.)

*To all whom it may concern:*

Be it known that I, PAUL FERDINAND RIBBE, engineer, a subject of the King of Prussia, German Emperor, residing at the city of Berlin, in the Kingdom of Prussia, German Empire, have invented certain new and useful Improvements in Electrode-Plates for Electric Accumulators, of which the following is a specification.

The present invention relates to an electrode-plate for electric accumulators in which supporting-plates of celluloid are connected together by means of celluloid solution after the insertion between them of a flat lead plate. The celluloid plates are so molded or stamped that they are connected together by means of the celluloid solution at suitable points to form one single whole through apertures in the lead plate. The active mass is placed in these new plates between each two long bars of celluloid of dovetail section, so that there are formed longitudinal cavities upon both sides of the lead plates between the celluloid bars, which cavities possess on each side an undercut piece for the reception of the active mass. The lead plates are provided with thickened rims, and the thickness is so proportioned that they correspond to the thickness of the longitudinal bars. Apart from the apertures in the lead plates the outer surfaces of the longitudinal bars are arranged to be in the same plane with the rim of the lead plate, in which plane thin perforated celluloid plates are arranged, which are also bent at the apertures of the lead plate and are secured by means of celluloid solution at the fixing-places of the longitudinal bars. A plate of this construction is illustrated in the accompanying drawings, in which—

Figure 1 shows a view of the plate; Fig. 2, a section on the lines $x\,x$ of Fig. 1; Fig. 3, a section on the lines $y\,y$ of Fig. 1. Fig. 4 shows a part of the plate in section on an enlarged scale. Fig. 5 is a section on the line $z\,z$ of Fig. 4. Fig. 6 is a view similar to Fig. 5, showing a modification of the celluloid bars.

The lead plate $d$ possesses the apertures $i$ and is provided with a rim $z$, surrounding it, which in the case of a plate of one millimeter thickness will be about three millimeters thick. Upon the said plate are arranged, at the places of each aperture $i$, two celluloid bars $g\,h$, one on each side, and these are bent in the manner illustrated in Figs. 2, 3, 4, and 5, so that they are in contact with one another through the lead plate. At the places of contact the celluloid bars $g\,h$ are connected together by celluloid solution. The celluloid bars have a thickness of about one millimeter and are undercut, so that the active mass inserted between the celluloid bars finds a hold, and the said celluloid bars lie in the same plane as the rim of the plate. After the insertion of the active mass $k$, which in the course of setting presses still firmer against its supports on each side, there is applied upon each side a thin celluloid plate $g'$ or $h'$, which plate is provided with many apertures in order to admit free access of the electrolytic fluid to the active mass. These plates $g'\,h'$ are secured by being bent over at the apertures in the lead plate and secured there by means of celluloid solution.

Having now particularly described and ascertained the nature of my said invention and in what manner the same is to be performed, I declare that what I claim is—

1. An electrode-plate comprising a lead plate $d$, having openings, the celluloid bars on each side of said plate and connected together through the openings thereof, said bars having undercut edges and the active material held thereby, substantially as described.

2. An electrode-plate comprising the perforated lead plate, the celluloid bars on each side thereof having portions bent through the said perforations and united by a celluloid solution, the said bar having undercut edges, the active material held thereby against the plate, and the perforated celluloid plate covering the active material and the celluloid bars, substantially as described.

In witness whereof I have hereunto set my hand in presence of two witnesses.

PAUL FERDINAND RIBBE.

Witnesses:
CHAS. H. DAY,
HENRY HASPER.